G. P. BOSWORTH.
KNITTING MACHINE.
APPLICATION FILED MAY 8, 1918.

1,428,317.

Patented Sept. 5, 1922.
8 SHEETS—SHEET 1.

Witness.
Oscar F. Hill

Inventor.
George P. Bosworth
by Chas. F. Randall
Attorney

G. P. BOSWORTH.
KNITTING MACHINE.
APPLICATION FILED MAY 8, 1918.

1,428,317.

Patented Sept. 5, 1922.
8 SHEETS—SHEET 3.

Witness:
Oscar F. Hill

Inventor:
George P. Bosworth
by Chas. F. Randall
Attorney.

G. P. BOSWORTH.
KNITTING MACHINE.
APPLICATION FILED MAY 8, 1918.

1,428,317.

Patented Sept. 5, 1922.
8 SHEETS—SHEET 5.

Witness:
Oscar F. Hill

Inventor
George P. Bosworth
by Chas. F. Randall
Attorney

Patented Sept. 5, 1922.

1,428,317

UNITED STATES PATENT OFFICE.

GEORGE P. BOSWORTH, OF CENTRAL FALLS, RHODE ISLAND, ASSIGNOR TO HEMPHILL COMPANY, OF PAWTUCKET, RHODE ISLAND, A CORPORATION OF MASSACHUSETTS.

KNITTING MACHINE.

Application filed May 8, 1918. Serial No. 233,301.

*To all whom it may concern:*

Be it known that I, GEORGE P. BOSWORTH, a citizen of the United States, residing at Central Falls, in the county of Providence, State of Rhode Island, have invented a certain new and useful Improvement in Knitting Machines, of which the following is a specification, reference being had therein to the accompanying drawings.

The invention is an improvement in circular knitting machines.

The invention resides in knitting mechanism of novel character intended for use in knitting glove-blanks or units, and other blanks or units having constructional characteristics similar to those which are typical of the said glove-blanks or units.

The features of the invention, in the more complete embodiment thereof, provided for knitting by a continuous operation a glove-unit, or a glove-web comprising a connected sequence of glove-units, respectively consisting of a tubular wrist-portion, a selvaged thumb-strip, and a tubular hand-portion, all integrally united and having a thumb-opening, and integral continuations of said hand-portion in the form of selvaged finger-strips, with said thumb-strip and finger-strips adapted to be formed into a complete thumb and fingers by seaming operations.

The invention consists in a novel knitting organization including special butts or heels in connection with the needles; a cam-system including cams which respectively are termed herein for convenience mass-withdrawal or plural-group withdrawal cams, needle-restoring, group withdrawal and group-selective cams; provisions whereby during reciprocating knitting each group of needles in succession while operative in the knitting of a strip is centralized for the time being being with reference to the knitting or stitch-cams and yarn-guide; and pattern-connections for controlling the various parts.

The special butts or heels and cams which are characteristic features of the invention constitute selective devices which provide for producing a selvaged thumb-strip at the proper point in the tubular hand-portion of a glove-unit, and selvaged finger-strips upon the end of the said hand-portion. They are so combined, co-ordinated, and controlled, that they selectively determine the group of needles which shall be operative to knit during the knitting (by reciprocating action) of a given strip, whereby to provide for making a flat web of the proper width to constitute such strip. Also, so that as soon as one finger-strip has been knit of the proper length they render its group of needles inoperative to knit and render a different group operative to knit one of the other finger-strips, and so on until all of the finger-strips have been produced in succession. Also, so that they cause certain of the needles of the group which was employed in knitting one finger-strip to be included in and made a part of the group employed in knitting the next adjoining finger-strip, in order that the respective finger-strips may be made of the required widths to produce glove-fingers of the required size, for instance in the case of the respective halves of the second and third fingers of a glove-unit. For the purposes of the present description I term the needles which are thus included "gusset needles."

In practice, the construction of the mechanism in which the principles and features of the invention are embodied may vary more or less, and the sequence and details of operation may vary more or less, all without involving a departure from the invention itself. By simple adaptations of the mechanism the formation of the thumb-strip and thumb-opening may be omitted, or the mechanism may be employed for the purpose of knitting finger-strips upon a previously-knit hand-portion which has been transferred from another machine, or the number and sizes of the finger-strips may be varied.

The accompanying drawings represent an illustrative embodiment of the principles and features of the invention, which has been contrived with the object in view of knitting a glove-web comprising a sequence of glove-units, each of the latter produced by—

First, knitting tubular fabric to form the wrist and a part of the hand-portion up to the root of the thumb.

Then proceeding to knit upon a certain group of needles, while the others remain out of action, until a selvaged flat strip has been produced of a length sufficient to form a thumb by doubling it back upon itself and uniting its opposite sides. The number of needles thus continued in action to form the thumb-strip, and the number of courses that are knit in such strip, will depend upon the desired width and length of the thumb-strip, which will be determined by the required size of thumb.

Then, knitting upon all the needles and producing tubular fabric to complete the hand-portion of the glove-unit up to the bases or roots of the fingers. The thumb-strip will have been seamlessly united at each end with the hand-portion, leaving a thumb-opening between its two end-portions.

After completing the hand-portion, proceeding to knit upon a certain group of the needles only, while the others remain out of action, and thereby producing a selvaged flat strip of fabric suitable for forming one of the outside fingers (herein the first or fore-finger) by doubling it lengthwise and seaming its side edges together and closing-up the end. Then proceeding to knit upon certain other needles, together with a part of those employed for the first finger-strip, to produce a selvaged flat strip of fabric to constitute one half of the adjoining finger, i. e., the outside half of such finger. Then knitting on adjoining needles, together with a part of those used in making the second strip, to produce a selvaged flat strip of fabric to constitute the corresponding (outside) half of the next adjoining finger. Then proceeding to knit upon adjoining needles to make a selvaged flat strip of a width suitable for forming the other outside finger (herein the little finger) by doubling it lengthwise and seaming its side edges together and closing-up the end. Then proceeding to knit successively other selvaged flat strips to form the remaining halves of the intermediate fingers, making provisions for sufficient width thereof in the same manner as in connection with the halves first formed.

A glove-unit thus produced has the inside and outside halves of the second and third fingers positioned upon opposite sides of the tubular hand-portion appropriately to come together and permit their respective edges to be joined to form the completed fingers. It has the thumb and finger-strips seamlessly or integrally united with the main or hand-portion.

In the drawings,—

Figure 7:
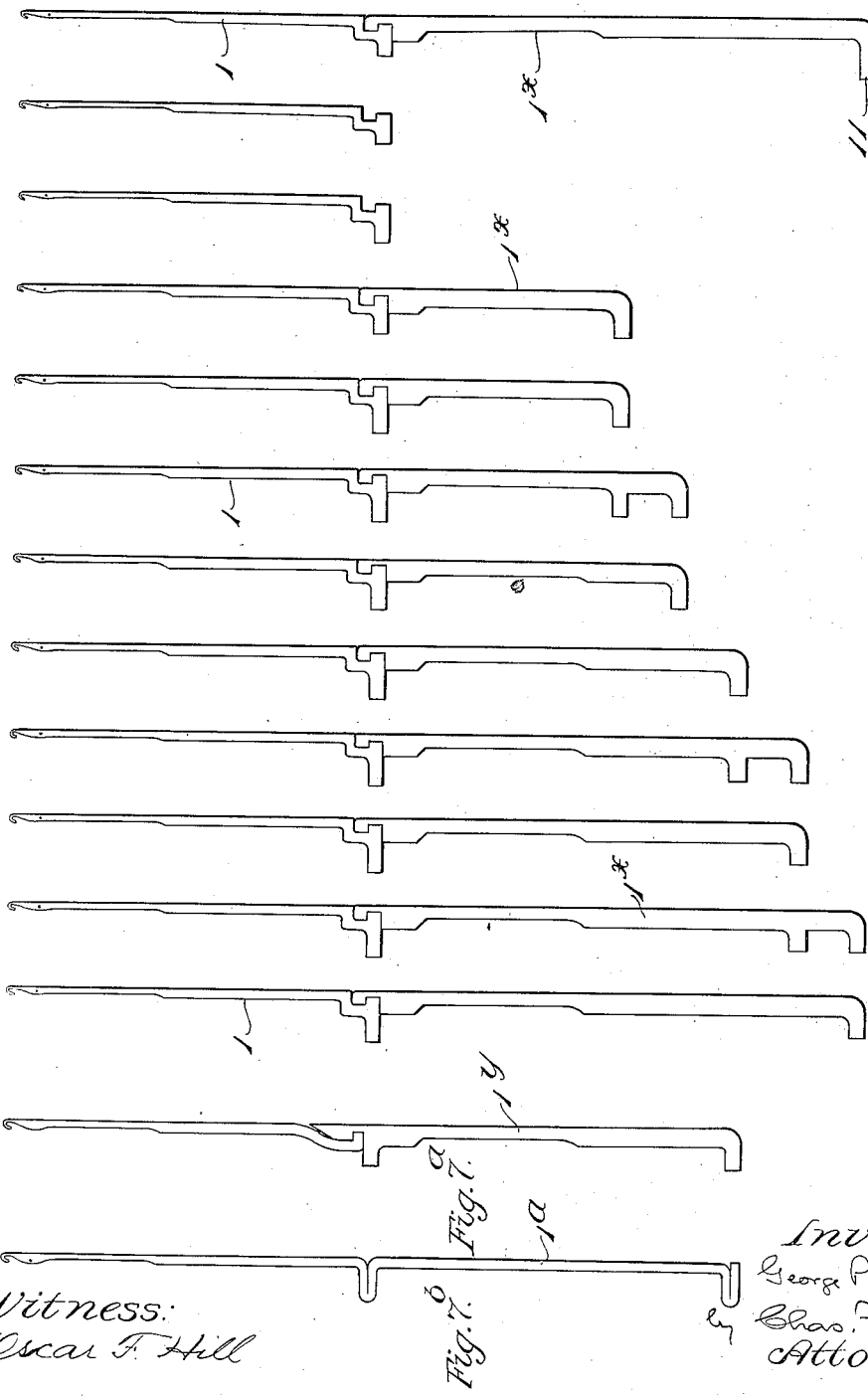
Fig. 7 is a view showing, side by side, needles and jacks representative of those comprising the working set contained in the said machine.

Figs. 7$^a$ and 7$^b$ show modifications of the needles and jack construction.

Figure 8:
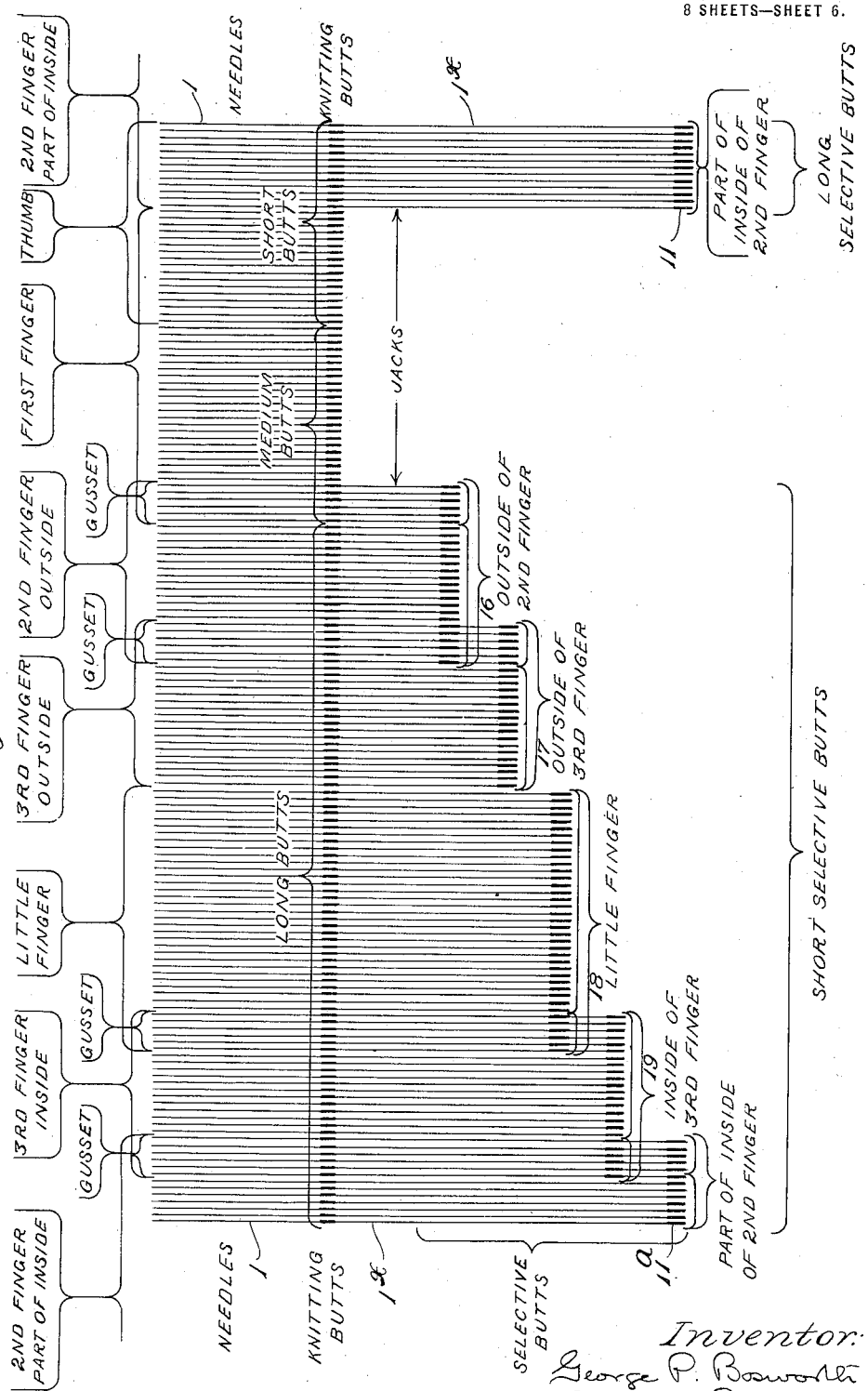

Fig. 8 is a diagram on the order of a development of the working set of needles and jacks in a plane.

Figure 9:
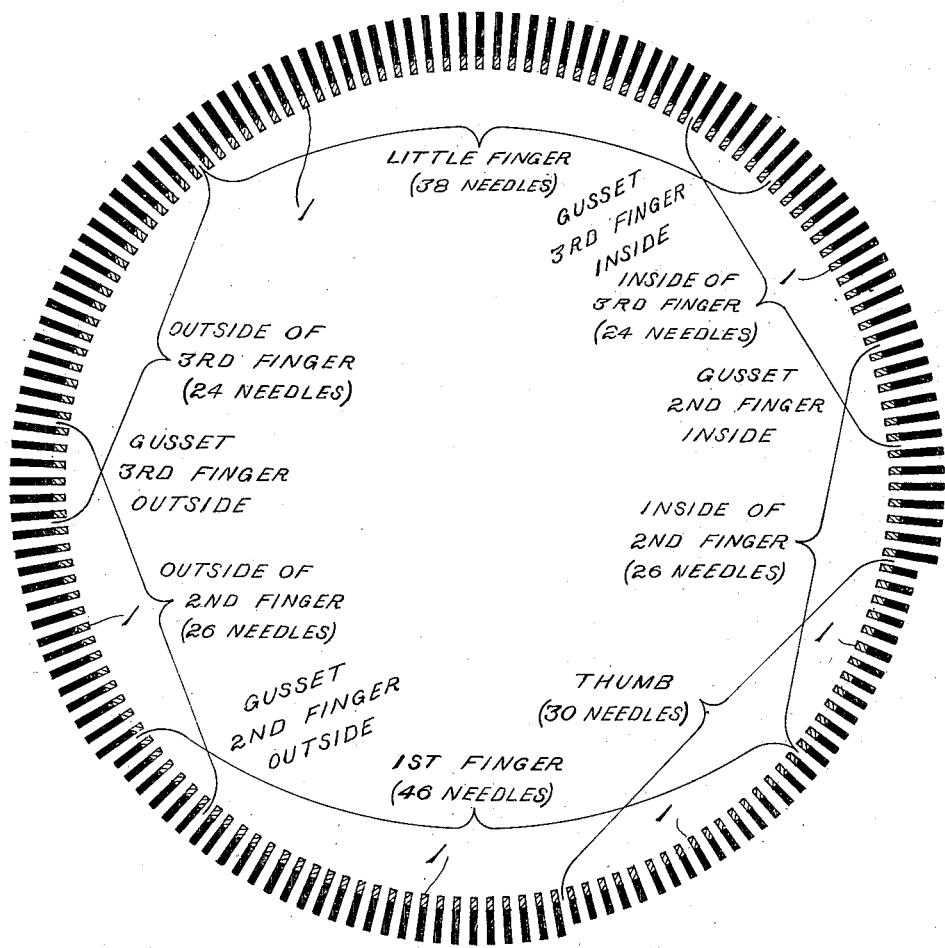

Fig. 9 is a diagram (on an enlarged scale) of the circular series of needles and their knitting butts, indicating how they are utilized in the knitting of a glove-unit.

Figure 10:
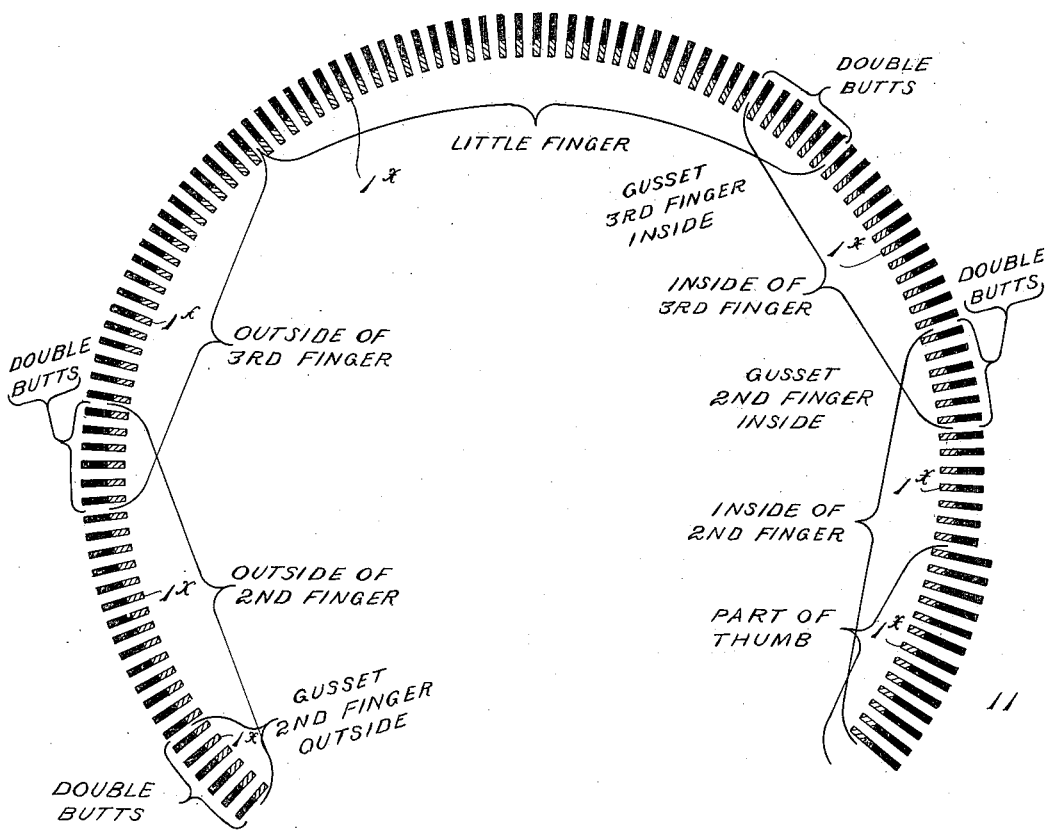

Fig. 10 is a diagram of the interrupted circular series of jacks, and their selective butts.

The machine that is partly shown in the drawings is the well-known Banner machine, with additions for the purposes of the invention, as will be apparent from the following description. The features of the Banner machine are substantially indicated in U. S. Letters Patent to J. D. Hemphill, No. 933,443, granted Sept. 7, 1909, for improvement in circular automatic stocking knitting machines. The drawings show only such parts of a machine in general as are required to be shown in order to render clear the relations, etc., of the parts which are involved more immediately in the invention.

Certain of the parts that are shown in the drawings hereof, corresponding with those of the said Patent No. 933,443, are designated herein by the same reference characters as in the patent. Thus, the machine-frame is marked $a$, the rotatable needle-cylinder (in Figs. 1, 2, 3) is marked N, and the non-rotatable cam-carrier is marked H, the annular portion or ledge of the said cam-carrier being marked M, and the knitting or stitch-cams being marked $c^2$, $c^3$, $x$, $x$, Fig. 6. The pulleys (shown in Fig. 1) for the driving band are marked $p$, $p'$, $p^2$, (respectively quick-speed, slow-speed, and loose or idle), and at $s$, (Fig. 2) is the main shaft, on which the said pulleys are mounted. At $s'$ (Figs. 1 and 2) is the pattern-shaft, $f$ and $g$ being the pattern-drums or pattern-barrels upon the said pattern-shaft, and $f'$ being the pattern-ring on drum or barrel $f$ which engages with the member $b^4$ carried by clutch-shifting lever $b'$, to control the said lever and through the same control the working of the machine to produce either continuous rotation of the needle-cylinder or reciprocating action thereof, as required. The details of the mechanism controlled by pattern-ring $f'$, through which at times the needle-cylinder is rotated continuously in a forward direction for round-and-round knitting, and at times is reciprocated forward and backward for flat knitting, may be substantially as in Patent No. 933,443, and are unnecessary to be shown herein. Yarn-guides (not shown) are mounted at the point $d'$, Fig. 1, in connection with latch-ring C.

Having reference to features which are more immediately connected with the invention:—

The special butts or heels and their disposition in connection with the needles are described in detail hereinafter. Two so-called mass-withdrawal or plural-group withdrawal cams 2 and 3, (Fig. 6), are employed in this embodiment of the features of the invention. They respectively are located at opposite sides of the knitting or stitch-cams $e^2$, $e^3$, $x$, $x$. A needle-restoring cam 6, is located in advance of the knitting or stitch-cams, adjacent the latter. At 10 is a group-withdrawal cam. At 15, etc., are group-selective cams. The provisions in connection with the needle-cylinder whereby the group of needles which is operative in the knitting of a strip is centered for the time being with reference to the knitting or stitch-cams and yarn-guide are described hereinafter. So also are the pattern-connections for controlling the various parts.

Referring first to the special butts or heels,—

Two sets of butts or heels are provided in connection with the needles 1, Figs. 7, 8, 9, in this embodiment. The butts or heels of one set, the upper set in the present instance, are adapted to be engaged by the knitting or stitch-cams $e^2$, $e^3$, $x$, $x$, for knitting purposes. Accordingly, the butts or heels of this set are termed herein the knitting butts, although herein for convenience the mass-withdrawal or plural-group withdrawal cams 2 and 3 also are arranged to engage with some of them in performing their function of rendering certain needles inoperative as a preliminary to the knitting of strips, and the needle-restoring cam 6 is arranged to engage with such butts or heels for the purpose of returning the inoperative needles to operative positions again at the proper times. While this engagement of the cams 2, 3, and 6 with the knitting butts for the said purposes is preferable, the needles may have other butts or heels for cooperation with such cams.

The butts or heels of the other set, herein the lower set, are adapted to be engaged only by the group-withdrawal cam 10 and the group-selecting cams 15, etc., in selecting the needle groups for finger-strip production. Accordingly, the butts or heels last mentioned are termed herein selective butts.

The so-called knitting butts herein are located above the so-called selective butts, to suit the illustrated relative disposition of the cams $e^2$, $e^3$, $x$, $x$, 2, 3, and 6, (which engage with the knitting butts), with respect to the cams 10, 15, etc., (engaging with the selective butts,) but the relative positions of the two sets of butts would be reversed in case the relative arrangement of the two sets of cams should be correspondingly modified.

In Fig. 7, the upper or knitting butts are formed upon short needles, and the lower or selective butts upon jacks $1^x$ detachably engaging with said short needles. If preferred, the knitting butts as well as the selective butts may be formed upon jacks $1^y$, as in Fig. $7^a$. Or, as in the case of the needle $1^a$ represented in Fig. $7^b$, both the knitting butts and the selective butts may be formed upon the needles themselves. It will be obvious that in effect the lower butts are located upon needle-extensions, whether the extensions be constituted by separate jacks as in Figs. 7 and $7^a$, or by integral portions of the needle-wires as in Fig. $7^b$.

The so-called mass-withdrawal or plural-group withdrawal cams 2 and 3 herein render needles inoperative to knit by raising them so as to elevate their knitting butts out of operative relations with respect to the knitting cams. In order that the said cams 2 and 3 may act selectively upon the needles, through their engagement with knitting butts, the latter are of different lengths, and are grouped in different series according to length. They are herein of three lengths, namely, long, medium, and short, as indicated in Figs. 7, 8 and 9, forming three series, as indicated by Figs. 8 and 9. As shown by Fig. 9, the series of long knitting butts extends around the greater part of the needle-cylinder. A series of short knitting butts, shown at the right-hand side in each of Figs. 8 and 9, adjoins one end of the series of long butts. Next to the left is a series of medium knitting butts, which completes the circle of knitting butts. As explained more fully hereinafter, the cams 2 and 3 select the needles on which the thumb-strip is to be knit by acting upwardly against the outer ends of the long and medium knitting butts, thereby raising the corresponding needles, they constituting the general mass of the needle-assemblage, into inoperative relations. In this action the said cams 2 and 3 do not engage with the short knitting butts, and consequently the needles having such butts are permitted to remain in operation. They constitute the group on which the thumb-strip is knit. In performing their part of the duty of selecting the needles on which the first-finger strip is to be knit the cams 2 and 3 act upwardly against the outer ends of the long knitting butts, and raise the long-butted needles into inoperative position, without engaging with either the short knitting butts or the medium knitting butts.

Referring now to the selective elements of the cam-system:—

The mass-withdrawal or plural-group withdrawal cams 2 and 3 normally occupy inoperative relations with respect to the needles. At the time when the change occurs from round-and-round or tubular knitting to reciprocating knitting for the production of a thumb-strip, the cams 2 and 3 are called into action in order that at such time they may withdraw from operative relations with the knitting or stitch-cams the general mass of the needles, i. e., those on which knitting is to be discontinued for the time being. They are again called into action for the performance of the same function at the time of changing from round-and-round to reciprocating knitting for the production of the first finger-strip.

The front mass-withdrawal or plural-group withdrawal cam 2 when in its normal inoperative relations occupies a position outward beyond the knitting butts. It is mounted with capacity to move radially inward and outward. When it occupies its operative or working inward position the engagement of its top edge with certain of the knitting butts operates to raise the corresponding needles into their inoperative positions. The rear mass-withdrawal or plural-group withdrawal cam 3 when in its normal inoperative relation occupies a position down below the top of ledge M of the cam-carrier, as shown in dotted lines in Fig. 6. It is mounted with capacity to move vertically. When it is raised from its position shown in Fig. 6 into its elevated working position the engagement of its top edge with certain of the knitting butts operates to raise the corresponding needles into inoperative position.

Figure 1:
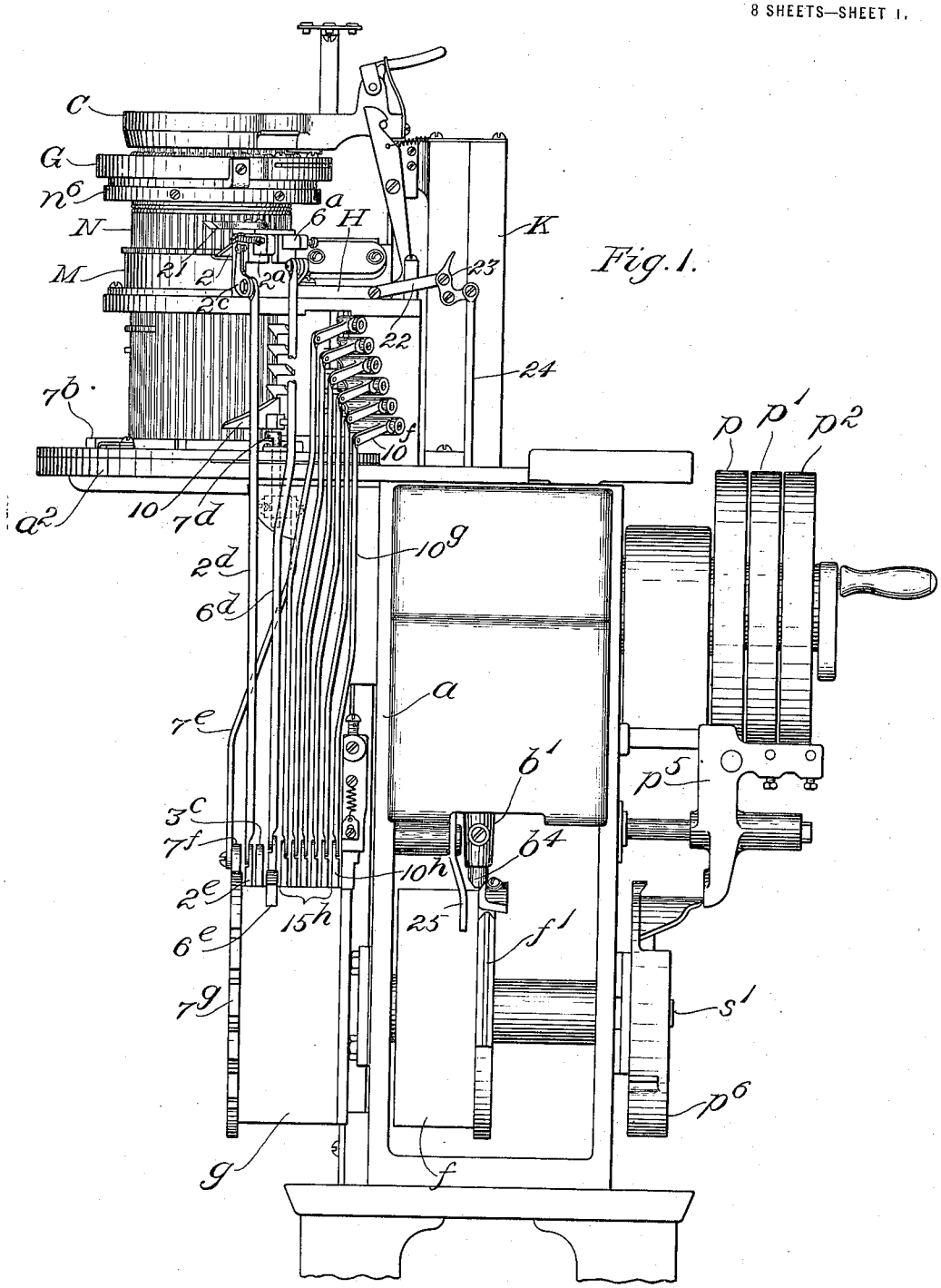
Fig. 1 shows in front elevation certain of the parts of a circular knitting machine containing the illustrative embodiment aforesaid of the principles of the invention.
Figure 2:
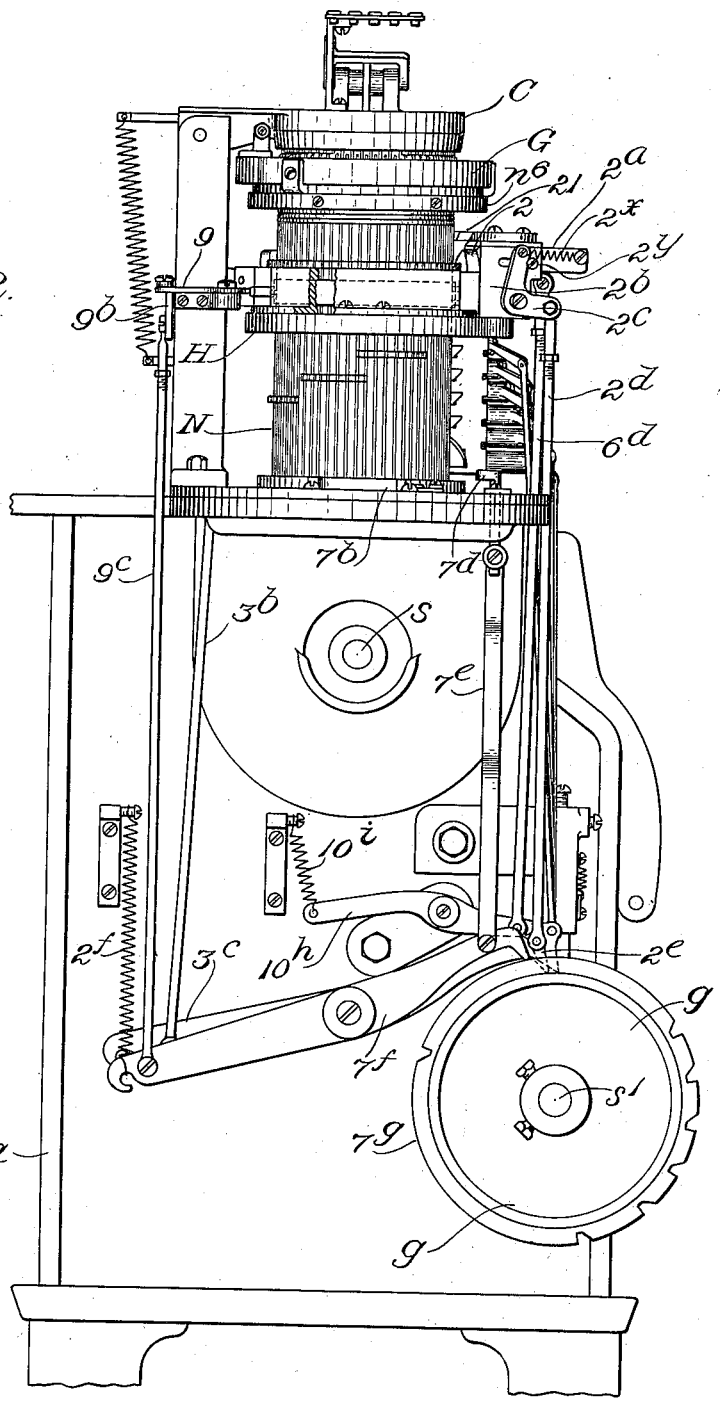
Fig. 2 is a side elevation of the said machine as shown in Fig. 1.
Figure 3:
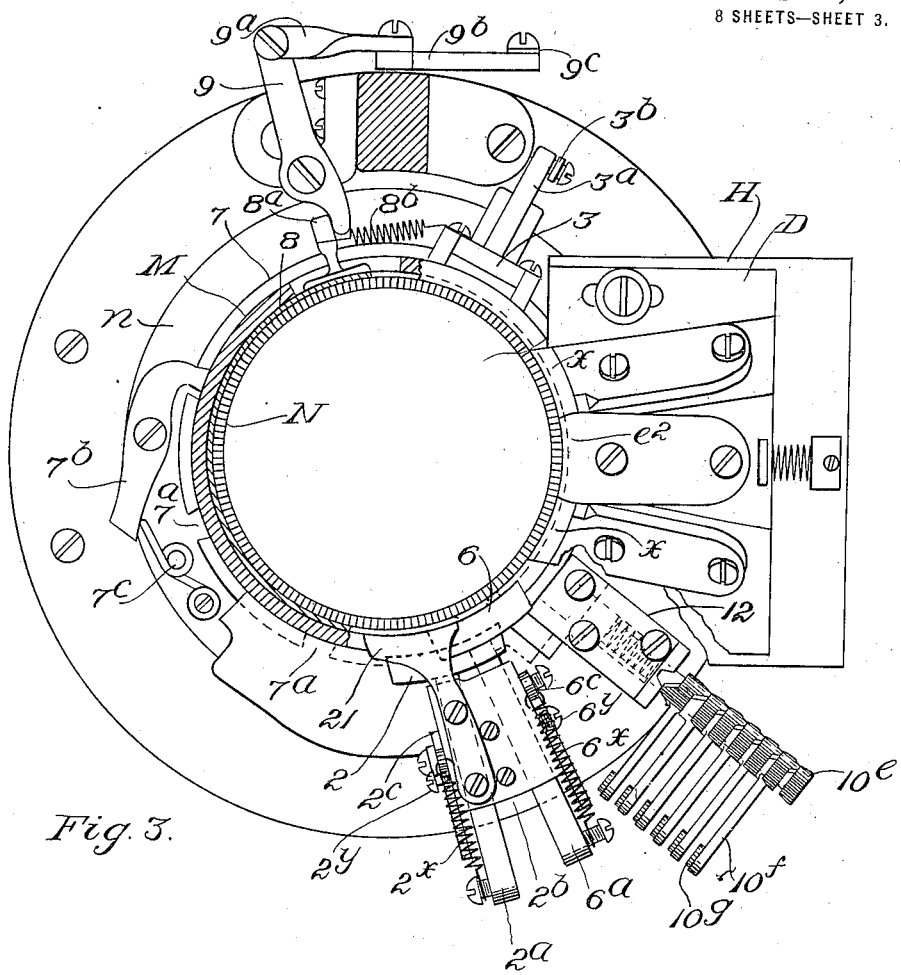
Fig. 3 is a view of the head of the said machine in horizontal section in a plane above the knitting cams and associated parts.

The mode and means of mounting and controlling the mass-withdrawal or plural-group withdrawal cams 2 and 3 may vary in practice. In Figs. 1 to 3 the front mass-withdrawal or plural-group withdrawal cam 2 is carried by a slide-bar $2^a$ that is mounted in a guideway in a support $2^b$ rising from the non-rotating cam-carrier H, and the particular pattern-connections shown in such figures comprise a bell-crank $2^c$ that is pivoted to said stand and connected by a rod $2^d$ with a pattern-finger $2^e$ that is impelled by a contracting spiral-spring (at $2^f$) toward the pattern-surface of the pattern-drum $g$. When a low portion of the said pattern-surface permits the said pattern-finger $2^e$ to occupy a depressed position it will act through the rod $2^d$ to hold the bell-crank $2^c$ rocked outwardly, so that, through engagement of its upwardly-extending arm with a screw $2^y$ projecting from slide-bar $2^a$ through a slot in the side of the support $2^b$, it will move the front special needle-raising cam 2 outward into inoperative position. As previously stated, the cam 2 normally occupies this inoperative position. An elevated pattern-indicator on drum $g$, by engaging with the said pattern-finger, operates to swing the bell-crank inward toward the needle-cylinder so as to put under increased tension a spiral spring $2^x$ connecting the bell-crank and the slide-bar together, so that such tension operates to move the cam yieldingly inward toward its operative position; that is to say, until the inward movement of the cam is arrested through contact of the inner face of the said cam with the outer ends of certain of the knitting butts, or with the periphery of the needle-cylinder, or by means of some other positive stop utilized for the purpose, as the case may be.

Herein, the rear mass-withdrawal or plural-groups withdrawal cam 3 is engaged by a lever $3^a$ Fig. 3 that is connected by a rod $3^b$ Figs. 1 and 3 to the rear arm of a pattern-finger $3^c$ Fig. 2 having combined therewith a contracting spiral-spring (at $2^f$) serving to keep its working end in contact with the pattern-surface of drum $g$. So long as the said working end rests against a depressed portion of the said pattern-surface the cam 3 occupies its depressed inoperative position, with its working portion below the level of the top of the annular portion or ledge M of the cam-carrier. When a raised pattern-indicator of the drum $g$ is presented to the working end of the said pattern-finger $3^c$, the said pattern-indicator acts through the said pattern-finger and the described connections to cause the cam 3 to be raised, so that its acting portion rises above the top surface of the said annular portion M into operative position to act upon long knitting butts.

Mass-withdrawal or plural-group withdrawal cams 2 and 3 resume their retracted inoperative positions as soon as they have done their work.

Figure 6:
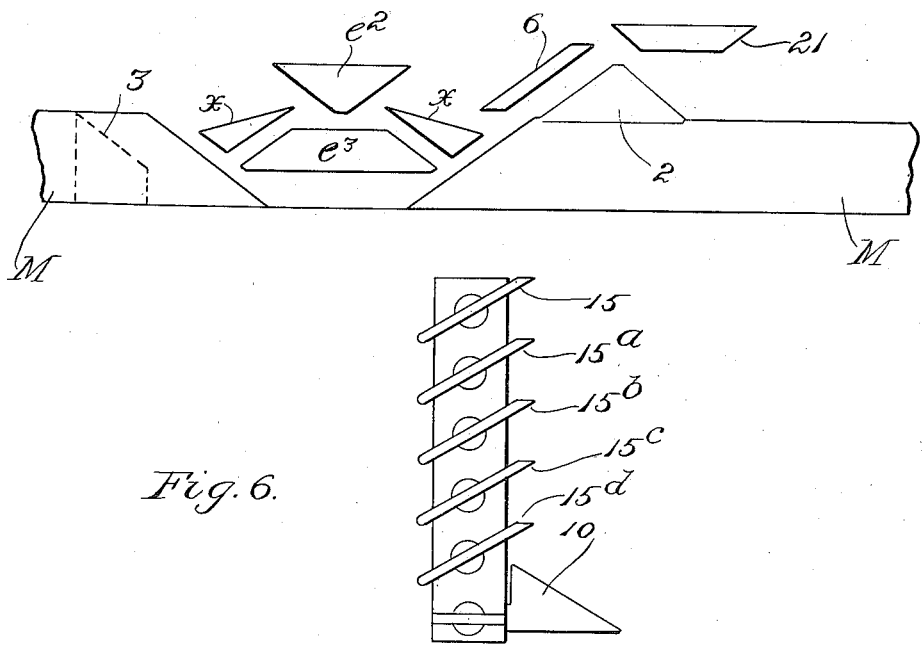
Fig. 6 is a diagrammatic view of the entire assemblage of cams employed in the machine of Figs. 1 to 3 for actuating and controlling the needles.

The so-called needle-restoring cam 6 Figs. 3 and 6 is located, as has been stated, in advance of the knitting or stitch-cams, between these latter and the front mass-withdrawal cam 2. It is mounted with capacity to move radially inward and outward relative to the needle-cylinder. Its inward position is its working or operative position. Its outward position is its idle or inoperative position. Normally (i. e., during round-and-round knitting) the cam 6 occupies its inward operative or working position, and its acting face through engagement with the knitting butts of any elevated passing needles operates to depress such needles so that said knitting butts will be engaged by the knitting or stitch-cams. As a preliminary to the knitting of the thumb-strip, the cam 6 is moved into its outwardly retracted and inoperative position in order that the needles raised into their inoperative position may remain in such position, without being interfered with by the cam 6. On the completion of the thumb-strip the cam 6 is moved inward again into its operative position, in order that in the turning movement of the needle-cylinder it may depress the said previously upraised needles into working relations with the knitting or stitch-cams and thereby render such needles operative again for the round-and-round knitting of the succeeding part of the hand-portion of the glove. It is also moved outward into inoperative position as a preliminary to the knitting of the first finger-strip, and later is moved inward into its operative position on the completion of the last of the finger-strips, in order that it may depress the needles at that time occupying upraised positions.

Herein, the needle-restoring cam 6 is carried by a slide-bar 6$^a$ Figs. 1 and 3 mounted in a guideway in the support 2$^b$. The operating connections of cam 6 are substantially the same as those of the front mass-withdrawal or plural-group withdrawal cam 2, and comprises a bell-crank 6$^c$, a rod 6$^d$, a pattern-finger 6$^e$ that is spring-borne against the pattern-surface of the drum $g$, and a spiral spring 6$^x$ connecting together the bell-crank and the slide-bar. When the bell-crank 6$^e$ is rocked away from the needle-cylinder its upwardly extending arm acts against a screw 6$^y$ projecting from slide-bar 6$^a$ to press the cam 6 outwardly, into inoperative position. When the said bell-crank is rocked toward the needle-cylinder it acts through the spring 6$^x$ to move the said cam 6 inward yieldingly toward the needle-cylinder, into operative position. The spring is intended to yield during the inward movement in case the cam 6 should bring up against the outer ends of knitting butts.

The so-called group-withdrawal cam 10 Figs. 1, 4, 5 and 6 is located at a point in advance of the knitting or stitch-cams. It is used to assist the cams 2 and 3 in selecting the needles on which the first finger-strip is to be knit. It does so by withdrawing from operative relations with reference to the knitting or stitch-cams. certain needles, not raised by cams 2 and 3, which are used in knitting the thumb-strip but are not used in knitting the first finger-strip. The needles which are thus withdrawn are those at the right hand end of the thumb-series. Their extensions or jacks 1$^x$ are furnished with long selective butts 11, Figs. 7, 8 and 10.

The group-withdrawal cam 10 is mounted with capacity to move radially inward and outward relative to the needle-cylinder. Its outward position is its idle or inoperative position. Its inward position is its working or operative position. Normally, it occupies its outward idle or inoperative position, clear of the selective butts or heels. As a preliminary to the knitting of the first finger-strip it is moved inward to its working or operative position, which is just near enough to the needle-cylinder to enable its acting upper edge to engage with the outer ends of the said long selective butts or heels 11.

The group-withdrawal cam 10 is controlled from the pattern-drum $g$. Figs. 1 to 5 show one convenient construction and arrangement of supporting means and controlling connections therefor. In said figures the said cam 10 is shown as mounted upon the inner end of a supporting-bar 10$^a$ that is fitted to move inward and outward in a stand 12 that is mounted upon a stationary part of the machine. The said bar 10$^a$ has combined with it a spring 10$^b$ operating with a tendency to move the bar and its cam 10 inward toward the needle-cylinder. The said spring is an expanding spiral spring which fits around a portion of the stem of the bar 10$^a$ within the hole in support 12 that is occupied by the bar, and the said spring is compressed between a shoulder on the bar and the inner end of the said hole. At the outer side of the support 12 the projecting stem of the bar is surrounded by a sleeve 10$^c$ capable of turning upon said stem and having V-shaped cam-projections 10$^d$ at its opposite ends, respectively working against the inner side of a collar 10$^e$ that is fixed to the outer end of the said stem, and against the outer side of stand 12, the said collar and stand having notches adapted to receive the said V-shaped projections 10$^d$. Spring 10$^b$ operates with a tendency to keep the inner face of collar 10$^e$ pressed against the outer ends of the cam-projections on the outer end of the sleeve and thereby keep the sleeve pressed inwardly toward the stand, with the cam-projections at the inner end of the sleeve held against the stand. Sleeve 10$^c$ is controlled by the pattern-drum $g$ through connections comprising an arm 10$^f$ projecting from the sleeve, a connecting rod 10$^g$, and a pattern-finger 10$^h$ Figs. 1 and 2 which is engaged by a contracting spring at 10$^f$ that keeps the working end of the said pattern-finger in contact with the pattern-surface.

Figure 4:
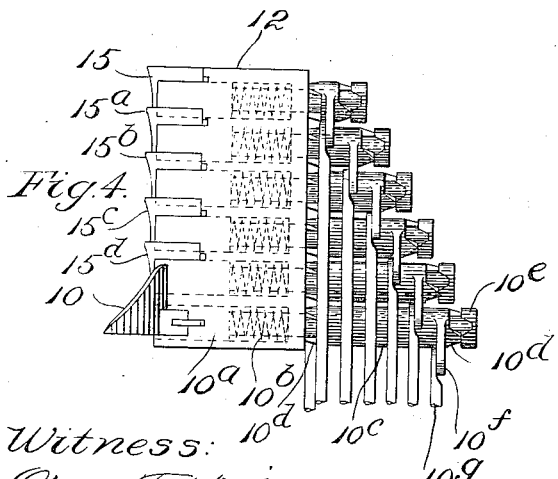
Fig. 4 is a side-elevation of what for the purposes of this specification may be termed the finger-strip-group selective cam, their support, and certain of the devices through which the said cams are controlled.
Figure 5:
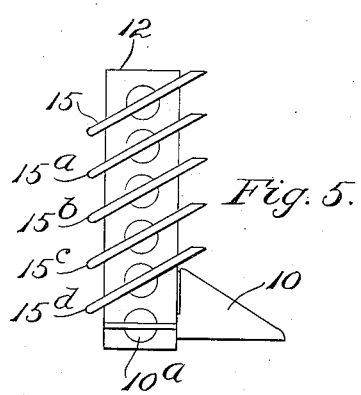
Fig. 5 is a face view of the cams and other parts of Fig. 4.

Normally, under the control of the pattern-surface the sleeve is caused to assume an angular position in which, as shown in Fig. 4, the cam-projections are out of line with the notches of collar 10$^e$ and of stand 12, and are presented to the straight inner shoulder of said collar and straight outer side of said stand. Consequently, during round-and-round knitting, the sleeve 10$^c$, the bar 10$^a$, and the group-withdrawal cam 10, are kept outward, namely with the said cam in its outwardly retracted position, outside of the circular path in which the selective butts 11 are carried around. When, however, the group of needles at the right hand end of the series previously used in knitting the thumb is to be rendered inoperative in making ready to knit the strip for the first finger, the pattern-devices act to rock sleeve $10^c$ so as to present the cam-projections $10^d$ thereof in line with the notches in collar $10^e$ and stand 12. This leaves the bar $10^a$ and cam 10 free to move inward under the push of spring $10^b$, and accordingly the cam assumes a position in which it engages the long selective butts 11 in the turning movement of the needle-cylinder and by its action thereon raises the said group of thumb needles into inoperative position.

So also the group-withdrawal cam 10 is withdrawn from action as soon as it has done its work, by a reverse rocking of sleeve $10^c$ which carries cam-projections $10^d$ around out of the notches in collar $10^e$ and stand 12, and through the action of such cam-projections operates to press the sleeve itself, the bar $10^a$ and cam 10 outward from the needle-cylinder.

The so-called group-selective cams 15, etc., are used for calling into operation the respective groups of needles (previously rendered inoperative as a preliminary to finger-strip knitting) on which are knit the successive finger-strips after the first thereof. They cooperate with rows of selective butts upon the needle-extensions or jacks that are provided in connection with the said needles.

The group-selective cams 15, etc., are located one above another in advance of the knitting or stitch-cams, adjacent the latter, as shown in Figs. 1, 2, 4, 5, 6, with the lowest one at about the same height as group-withdrawal cam 10. They individually are mounted with capacity to move radially inward and outward relative to the needle-cylinder. Normally they occupy their outward positions, which are their idle or inoperative positions, and in which they are clear of the selective butts or heels which are provided for cooperation with these cams. Their inward positions are their working or operative positions.

There is one group-selective cam for each finger-strip except the first, and the selective butts or heels in connection with the needles of the group for a given finger-strip are in a row on substantially the same level as the group-selective cam for such strip. Consequently the respective rows of selective butts or heels cooperating with the group-selective cams are stepped vertically with reference to one another, as indicated in Figs. 2, 7, and 8.

As a preliminary to the knitting of a given finger-strip, for instance the outside strip for the second finger, the group-selective cam for such strip is moved inward to its working or operative position, so that the said cam through its engagement with the selective butts or heels of the corresponding row may move down the previously upraised needles of the group on which such strip is to be knit, so as to place their knitting butts or heels in working relations with the knitting or stitch-cams. This operation is repeated in the case of each of the other group-selective cams in turn, preliminary to the knitting of the succeeding finger-strips.

Herein, the respective group-selective cams 15, etc., are mounted in connection with stand 12 in the same manner as group-withdrawal cam 10, and their operating connections are similar to those of said cam 10, such connections including pattern-fingers $15^h$ through which the cams 15 are controlled by pattern-drum $g$.

The provisions in connection with the needle-cylinder, for centering for the time being, with reference to the knitting or stitch-cams and the yarn-guide, the group of needles which is operative in the knitting of a strip, consist in means for effecting an angular shift of the needle-cylinder with relation to its actuating connections. This angular shift is caused to take place preliminary to the knitting of every strip. Thereby, during the knitting of each of the respective strips the particular group of needles which is operative for the time being is caused to swing to equal or substantially equal extents in opposite directions past the said cams and the yarn-guide. The angular shift is effected a suitable number of times as the successive groups of needles around the needle-cylinder are brought into operation, one after the other.

In the illustrated machine, the angular shift just mentioned is provided for by connecting the needle-cylinder N with the horizontal actuating gear $n$ therefor by means of clutch-devices permitting a relative angular shift of the cylinder with respect to the said actuating gear. A convenient form of the said clutch-devices is shown in Figs. 1, 2 and 3, in which figures a horizontal flange 7 Fig. 3 connected with the base of the needle-cylinder has formed therein a series of notches $7^a$, $7^a$, etc., and a dog $7^b$ is mounted movably in connection with said gear $n$, the said dog having combined therewith an actuating spring $7^c$ by means of which the engaging end of the dog is pressed toward the needle-cylinder. Normally the said engaging end of the dog occupies one of the notches $7^a$, so that thereby the needle-cylinder is clutched to the horizontal actuating gear. In order to bring about a centralizing shift, the dog is disengaged from the notch which it first occupies, and movement of gear $n$ taking place while the needle-cylinder stands still transfers the dog over into the next adjacent notch.

To provide for the disengagement of the dog, a shifter-lug $7^d$, Figs. 1 and 2, is provided at the upper end of a rod $7^e$, which latter extends down to and is connected with a pattern-finger $7^f$, the working end of which is held by means of a spring (at $2^f$) in engagement with a line $7^g$ of pattern-indicators upon the drum $g$. Normally the lug $7^d$ occupies an inoperative position above the plane in which the tail of dog $7^b$ works. A depression in the said line of pattern-indicators at the proper point allows the pattern-finger $7^f$ to move so as to draw the lug $7^d$ down from its normal elevated position into the path of the tail of the dog $7^b$. This takes place at the end of the forward stroke of the needle-cylinder. Consequently, in the first part of the ensuing reverse movement of the actuating gear and the needle-cylinder, before they have picked up speed, the tail of the dog is carried against the lug, with the result that the engaging end of the dog is disengaged from the notch occupied by it in the needle-cylinder flange, so that the actuating gear is unclutched from the needle-cylinder and for a portion of said reverse movement moves independently of the needle-cylinder, that is to say, until the dog enters the next notch. The dog slips around the periphery of flange 7 from one notch $7^a$ to the next.

For the purpose of holding the needle-cylinder from movement during the independent movement of the actuating gear $n$, a braking or checking device is provided. A convenient form thereof comprises a brake-band 8, Fig. 3, which herein surrounds about one-half of the circumference of the lower portion of the needle-cylinder, one end thereof being suitably fixed in connection with the cam-carrier H or its ledge M, while the other end thereof has connected with it a finger $8^a$ with which is engaged one end of a contracting spiral spring $8^b$. Normally the brake-band is held in a slackened condition through the engagement of a horizontally-working lever 9, Fig. 3, with the finger $8^a$, so that the slackened brake-band does not oppose the revolution of the needle-cylinder. When the said spring is permitted to act, concurrently with the disengagement of the dog from the needle-cylinder, it tightens the brake-band around and against the needle-cylinder so as to oppose movement of the needle-cylinder. Thereby the needle-cylinder is held from movement while the dog slides around the outer periphery of the needle-cylinder flange to the next adjacent notch of the series of notches.

At the time when the brake-band should be permitted to act, the lever 9 is operated to release the brake-band to its actuating spring $8^b$. Herein, said lever 9 has its outer arm connected by means of a rod $9^a$ to a bell-crank $9^b$, the latter being connected by means of a rod $9^c$ with the rear arm of the pattern-finger $7^f$. By reason of these connections between the lever 9 and the pattern-finger $7^f$ it follows that the same movement of the said pattern-finger which lowers the lug $7^d$ into position to engage the dog $7^b$ and disengage it from the needle-cylinder also operates to move the lever 9 so as to withdraw it from the finger $8^a$ of the brake-band and thereby release the brake-band to the action of the contracting spiral spring $8^b$, which thereupon contracts the brake-band around the needle-cylinder so as to produce the required holding effect.

An elevated portion of the line $7^g$ of pattern-indicators on the drum $g$ operates the pattern-finger $7^f$ to raise the lug $7^d$ into inoperative position again, and also to cause the lever 9 to re-engage with the finger $8^a$ of the brake-band 8 so as to slacken the brake-band. Consequently the needle-cylinder having been reclutched to its horizontal actuating gear, it is permitted to move reciprocatingly with such gear.

In the knitting of a glove-unit, the special features of the operation are as follows:

For the selection of the thumb-strip needles, which in this instance are the ones having short knitting butts, the pattern-connections call for movement of needle-restoring cam 6 outward to its inoperative position, and movement of the two mass-withdrawal or plural-group withdrawal cams 2 and 3 toward their operative positions, during the last forward revolution of the needle-cylinder in the round-and-round knitting by which the tubular wrist is produced. The rear cam 3 rises under long knitting butts at the rear side of the needle-cylinder, and in the remainder of the said forward revolution raises into inoperative position all of the succeeding long-butted needles. It does not raise any of the short-butted needles, because its position is radially outward beyond the outer ends of the short butts, so that the latter pass it without being acted upon thereby. The inward movement of the front cam 2 carries the inner side of such cam yieldingly against the outer ends of certain of the knitting butts, usually the short butts, but as soon as the onward turning movement of the needle-cylinder carries such butts past the cam 2 the medium butts of the succeeding series of needles are carried against its front face, so that such face acts to raise the latter needles, and it also acts under the long butts of the long-butted needles which were not raised by the rear cam 3, to raise such long-butted needles. Consequently, by the conjoint action of the two cams 2 and 3, all of the needles except the short-butted needles are raised into inoperative position in the said forward revolution of the needle-cylinder. Thus in effect, the selection of the thumb-strip needles is effected in the same continuous stroke (i. e., continuous movement) of the needle-cylinder in one direction. In case the yielding inward movement of the front cam 2 should carry its inner side against the outer ends of long butts just preceding the short butts of the thumb needles, the action will be practically the same as just explained, with the addition that when the said long knitting butts have passed by the cam 2 the said cam will move inward against the outer ends of the short butts.

The pattern-indicators of drum $g$ permit the special needle-raising cams 2 and 3 to return outward to their retracted position, clear of the path of the knitting butts, before the needle-cylinder begins its first reverse movement, after they have rendered the required number of needles inoperative. The special needle-lowering cam 6, however, remains in the outwardly retracted and inoperative position which was given to it as just explained, until the thumb strip has been completed.

The action of pattern-indicators of drum $g$ in connection with pattern-finger $7^f$ causes the lug $7^d$ to be lowered into position to act upon the dog $7^b$, so that at the beginning of the said reverse movement the lug acts to disengage the dog from the notch $7^a$ occupied by it. At the same time, the brake-band tightens so as to hold the needle-cylinder from turning while unclutched from gear $n$. Consequently, shift of the dog to the next rearward notch $7^a$ takes place, following which the lug is raised into inoperative position relative to the dog and the pressure of the brake-band upon the needle-cylinder is relieved. The thumb-strip is knit by reciprocating knitting, with the thumb-group of needles properly centralized with reference to the knitting or stitch-cams and yarn-guide.

When the required length of thumb strip has been completed, the actuation of pattern-finger $6^e$ by the pattern-drum $g$ returns the needle-restoring cam 6 inward to its operative position, and as the needle-cylinder resumes continuous rotary movement the upraised needles are lowered by the action of such cam upon their knitting butts, from their inoperative position into their operative position. Round-and-round knitting proceeds for the knitting of the hand.

When the tubular hand-portion of the glove-unit has been knit of sufficient length, the strip for the first finger is knit upon the medium-butted needles and the left-hand portion of the short-butted needles. The remaining needles are retired from operation. This is provided for by withdrawal of the needle-restoring cam 6 into an inoperative position, (to remain in such position, as stated hereinbefore, until all the finger-strips have been knit), accompanied by the raising of the mass-withdrawal or plural-group withdrawal cam 3 into operative position, and by the front mass-withdrawal or plural-group withdrawal cam 2 being permitted to move inward into operative position. In moving inward, the said cam 2 lands against the outer ends of the series of medium knitting butts as a result of the forward shogging of the needle-cylinder which took place because of the shift of dog $7^b$ from the original notch $7^a$ to another notch in beginning to knit the thumb-strip. Cam 3 raises those long-butted needles which are carried past it by the final portion of the forward turning movement of the needle-cylinder, and after the medium butts have passed cam 2 the latter acts upon the succeeding long butts to raise those long-butted needles which are not raised by cam 3.

Owing to the fact that the strip for the first finger is only partially in line with the thumb-strip, the right-hand needles of the thumb-series are not used in producing the former. For the purpose of rendering the said right-hand thumb-needles inoperative at this time, the group-withdrawal cam 10 is brought into operative position, in order that its top face may engage with the series 11 of selective butts upon the extensions or jacks of such needles and raise the latter. Thus, in effect, the selection of the needles for the first finger strip is effected in the same continuous stroke (i. e., continuous movement) of the needle cylinder in one direction. The cams 2, 3 and 10 are withdrawn into inoperative position after having functioned. A second shift of the dog $7^b$, namely from the notch $7^a$ occupied by it during the knitting of the thumb and tubular hand-portion into the next succeeding notch, centralizes the first-finger strip group of needles with relation to the knitting or stitch-cams and yarn-guide. Reciprocating knitting upon the said group of needles continues until such strip has been produced of the required length.

All the selective butts except group 11 pertaining to the right-hand thumb-needles are short. This enables the group-withdrawal cam 10 to approach sufficiently close to the needle-cylinder to engage with the long selective butts 11 of the said needles, without engaging with the short selective butts $11^a$, Fig 8, which are alongside and in line with said butts 11. Consequently, at the time when the needles for use in knitting the first-finger strips are selected, the group-withdrawal cam 10 acts upon butts 11 to raise the right-hand thumb-needles into inoperative relations with the knitting or stitch-cams without disturbing the needles to which butts $11^a$ pertain.

Upon the completion of the first finger strip, and as preliminaries to the knitting of the outside strip of the second finger the front mass-withdrawal or plural-groups withdrawal cam 2 and top group-selective cam, 15, are moved into operative position as the needle-cylinder completes a forward stroke. Another shift of dog 7ᵇ to a different notch 7ᵃ takes place at the beginning of the reverse stroke for the purpose of centralizing with reference to the knitting or stitch-cams and yarn-guide the group of needles which is to be used for the said strip. In this reverse stroke the back of cam 2 raises into inoperative position all of the needles that were used in knitting the first finger strip, through engagement with the knitting butts thereof. Incidentally, the back of the top-selective cam also acts through engagement with the selective butts of the top row, 16, Fig. 8, to raise the needles for the said outside strip, but these needles are immediately depressed into position to be further engaged by the top-selective cam by means of a fixed needle-depressing cam 21. In the ensuing forward stroke of the needle-cylinder the group-selective cam 15, through its engagement with the selective butts of the top row 16 of selective butts, moves the corresponding needles down into operative relations with the knitting or stitching-cams. For widening purposes, the needle-extensions or jacks in connection with certain of the needles which are employed in knitting the first-finger strip are provided with supplemental selective butts which are included in row 16. Consequently, these needles, which I term widening or gusset needles, are called back into operation again by cam 15 for use in knitting the outside second-finger strip after having been moved into inoperative position by cam 2 as just mentioned upon the completion of the first-finger strip. They knit a widening or gusset at one edge of such strip. The cams 2 and 15 resume their normal retracted positions after functioning, and the outside second-finger strip is knit by a continuation of the reciprocating knitting.

With reference to the incidental lifting of the needles for the outside second-finger strip in the first reverse movement of the needle-cylinder, it is to be noted that the particular group-selective cams 15, etc., shown in the drawings are so shaped that in the return movement of the needle-cylinder following the calling of one of such cams into working position, the back of the said cam engages with the corresponding row of selective butts and as a result raises the latter entirely above the cam. This is due wholly to the particular shape that is shown in the drawings, and may easily be avoided by adopting an obvious different form of selective cam. To return the thus upraised butts into a position in which they will be engaged by the same group-selective cam in the next forward stroke of the needle-cylinder, I employ herein the supplemental needle-restoring cam 21, Fig. 6, by means of which, immediately after the needles have been raised by the back of the acting group-selective cam they are depressed to a level within reach of such cam. This supplemental needle-restoring cam 21 occupies a fixed position upon the cam-carrier.

Upon completion of the outside strip for the second finger, substantially the same procedure is repeated for the production of the outside strip for the third finger, the second group-selective cam, 15ᵃ, being called into action so that through engagement with the selective butts of the second row, 17, Fig. 8, it moves down into operative relations with the knitting or stitch-cams the needles composing the group which is used in knitting the strip last-mentioned. This group includes as widening or gusset needles a portion of those which were used in knitting the outside strip for the second finger. These widening or gusset needles have selective butts which form a part of row 17.

Upon completion of the outside strip for the third finger, substantially the same procedure is repeated for the production of the little-finger strip, using the third selective cam, 15ᵇ, for engagement with the selective butts of the third row, 18, to move down into operative relations with the knitting or stitch-cams the needles which are used in such production, but in this instance none of the needles of the preceding strip are used as widening or gusset needles.

Upon completion of the little-finger strip, the procedure is repeated successively in the case of the inside strip for the third finger and the inside strip for the second finger, using the fourth selective cam, 15ᶜ, for engagement with the fourth row, 19, of selective butts for the first-mentioned thereof, and the fifth selective cam, 15ᵈ, for engagement with the fifth row, 11ᵃ, 11, of selective butts for the other. Widening or gusset needles are used in knitting both of these inside strips, as will appear from Figs. 8 and 10.

This completes the knitting of the finger-strips. Needle-restoring cam 6 is called into operation for the purpose of returning all of the inoperative needles to operative relations with the knitting or stitch-cams, and round-and-round or tubular knitting is now resumed for the wrist-portion of the next glove-unit.

It will be observed that in the course of the preceding description, references have been made to the group of needles required for the production of each of the strips being selected in a given stroke, by which is contemplated a continuous operative movement in one direction.

Upon the completion of a glove-unit, the latter may be dropped off, if desired, and a rib-top or cuff transferred to the needles prior to beginning to knit another glove-unit, or a light yarn may be used in knitting a few courses before the next glove-unit is begun, in order to facilitate breaking the two glove-units apart, or knitting may be continued with the same yarn, with or without a slack course. The machine will be constructed in well-known manner to provide for the transfer just mentioned, including the features of a radially-movable supporting-block for the knitting or stitch-cams $e^2$, $e^3$, $x$, $x$, and automatic devices for occasioning the radial movement, such for instance as the connecting-link 22, bell-crank 23, connecting-link 24, and pattern-finger 25 controlled by the indicators of the pattern-drum or pattern-barrel $f$.

The employment of certain needles, first in the production of a given strip and then as widening or gusset needles in the production of an adjoining strip, enables the group of finger-strips to comprise a total number of wales exceeding materially the total number of needles contained in the machine.

After the completion of the knitting of a glove-unit, and its removal from the knitting machine, the widennig or gusset of a given finger-strip is cut across at the junction of its base-portion with the tip-portion of the adjoining strip. The outside and inside strips of the second finger are united to each other along their edges and at their ends, and so are those of the third finger.

According to the assembling of the pattern-indicators in the machine, all of the glove-units produced by the latter may be for the same hand, or they may be alternately right-handed and left-handed if desired.

Under varying conditions of working, the action of the parts may be modified more or less in practice. By variation in the timing, the shares respectively performed by the mass-withdrawal cams 2 and 3 may be varied, so that cam 3 may become the principal mass-withdrawal or plural-group withdrawal cam instead of cam 2 as in the foregoing description. By a simple adaptation of the devices, the thumb-strip may be formed, like the first-finger strip, of the full width required to fit entirely around the thumb of the wearer, and be finished-off by being seamed along the open side, across the end, and around the thumb-opening. In some cases, the thumb-strip and thumb-opening may be omitted in the knitting of the glove-unit, in which event a thumb-opening will be formed subsequently and a thumb-tube be inserted and attached.

What is claimed as the invention is,—

1. In a circular knitting machine constructed for rotary and reciprocating knitting, an organization for the knitting of glove-units and the like composed of tubular web and selvaged flat strips integral therewith, comprising essentially, in combination with a needle-cylinder, needles, and knitting or stitch-cams, special butts or heels in connection with the needles, mass-withdrawal, group-withdrawal, group-selective, and needle-restoring cams, provision whereby during reciprocating knitting the group of needles that is operative in the production of a strip is centralized for the time being with reference to the knitting or stitch-cams, and pattern-connections for controlling the various parts.

2. In a circular knitting machine constructed for rotary and reciprocating knitting, an organization for the knitting of glove-units and the like, comprising essentially, in combination with a needle-cylinder, needles, and knitting or stitch-cams, special butts or heels in connection with the needles, mass-withdrawal, group-withdrawal, group-selective, and needle-restoring cams, certain of the needles having supplemental selective butts or heels with which the group-selective cams engage to cause such needles to serve as widening or gusset needles, provisions whereby during reciprocating knitting the group of needles that is operative in the production of a strip is centralized for the time being with reference to the knitting or stitch-cams, and pattern-connections for controlling the various parts.

3. In a circular knitting machine constructed for rotary and reciprocating knitting, an organization for the knitting of glove-units and the like composed of tubular web and selvaged flat strips integral therewith, comprising essentially, in combination with a needle-cylinder, needles, and knitting or stitch-cams, a vertically movable mass-withdrawal cam, a yieldingly-actuated radially movable mass-withdrawal cam, a group-withdrawal cam, a plurality of group-selective cams, a needle-restoring cam, butts or heels of different lengths in groups for engagement by said mass-withdrawal and restoring cams, selective butts in groups for engagement by said group-withdrawal and group-selective cams, provisions whereby during reciprocating knitting the group of needles that is operated for the production of a strip is centralized for the time being with reference to the knitting or stitch-cams, and pattern-connections for controlling the various parts.

4. In a circular knitting machine constructed for rotary and reciprocating knitting, an organization for the knitting of glove-units and the like composed of tubular web and selvaged flat strips integral therewith, comprising essentially, in combination with a needle-cylinder, needles, and knitting or stitch-cams, a vertically movable mass-withdrawal cam, a yieldingly-actuated radially movable mass-withdrawal cam, a group-withdrawal cam, a plurality of group-selective cams, a needle-restoring cam, butts or heels of different lengths in groups for engagement by said mass-withdrawal and restoring cams, selective butts in groups for engagement by said group-withdrawal and group-selective cams, certain of the needles having selective butts in two adjoining groups to cause such needles to constitute widening or gusset needles, provisions whereby during reciprocating knitting the group of needles that is operative for the production of a strip is centralized for the time being with reference to the knitting or stitch-cams, and pattern-connections for controlling the various parts.

5. A circular knitting machine comprising, in combination with a needle-cylinder, a circular series of needles, knitting or stitch-cams, and pattern-controlled actuating connections for rotary and reciprocating knitting, pattern-controlled means whereby a group of said needles is selected in a given stroke for producing by reciprocating knitting a selvaged flat strip in continuation of tubular work and the remaining needles are rendered inoperative to knit, and pattern-controlled means for centralizing in a given stroke by relative angular shift the said group and the said knitting or stitch-cams with reference to each other for the knitting of the said selvaged strip.

6. In a circular knitting machine constructed for rotary and reciprocating knitting, an organization comprising essentially, in combination with a needle-cylinder, needles, and knitting or stitch-cams, one or more withdrawal cams whereby the needles used in knitting a tubular web are rendered inoperative to knit with the exception of a selected group of needles on which a selvaged flat strip is knit by reciprocating knitting, means for centralizing the selected group of needles and knitting or stitch-cams with reference to each other during the reciprocating knitting, and pattern-connections for controlling the various parts.

7. In a circular knitting machine constructed for rotary and reciprocating knitting, an organization for the knitting of glove-units and the like composed of tubular web and selvaged flat strips integral therewith, comprising essentially, in combination with a needle-cylinder, a circular series of needles, knitting or stitch-cams, and pattern-controlled actuating connections for rotary and reciprocating knitting, means whereby for each of said strips in succession the group of needles required for producing such strip by reciprocating knitting in continuation of the tubular web is selected in a given stroke, pattern-controlled means for centralizing in a given stroke by relative angular shift the said group and the said knitting or stitch-cams with reference to each other, and means for restoring all of the needles to operative relations on the completion of the last strip.

8. In a circular knitting machine constructed for rotary and reciprocating knitting, an organization for the knitting of glove-units and the like, comprising essentially, in combination with a needle-cylinder, needles, and knitting or stitch-cams, special butts or heels in connection with the needles, withdrawal and group-selective cams, by the former of which the needles that are not required for the production of a selvaged strip are withdrawn from operative relations and afterward those used for such production and for that of the succeeding strip or strips are likewise withdrawn, and the latter acting to return to operative relations for the production of each of the succeeding strips the needles that are required therefor, provisions whereby during reciprocating knitting each group of needles in succession while operative is centralized with reference to the knitting or stitch-cams, and pattern-connections for controlling the various parts.

9. In a circular knitting machine constructed for rotary and reciprocating knitting, an organization for the knitting of glove-units and the like, comprising essentially, in combination with a needle-cylinder, needles, and knitting or stitch-cams, special butts or heels in connection with the needles, withdrawal and group-selective cams, by the former of which the needles that are not required for the production of a selvaged strip are withdrawn from operative relations and afterward those used for such production and for that of the succeeding strip or strips are likewise withdrawn, and the latter acting to return to operative relations for the production of each of the succeeding strips the needles that are required therefor, including widening or gusset needles, provisions whereby during reciprocating knitting each group of needles in succession while operative is centralized with reference to the knitting or stitch-cams, and pattern-connections for controlling the various parts.

10. In a circular knitting machine constructed for rotary and reciprocating knitting, an organization for the knitting of glove-units and the like, comprising essentially, in combination with a needle-cylinder, needles, and knitting or stitch-cams, special butts or heels in connection with the needles, withdrawal and group-selective cams, by the former of which the needles that are not required for the production of a selvaged strip are withdrawn from operative relations and afterward those used for such production and for that of the succeeding strip or strips are likewise withdrawn, and the latter acting to return to operative relations for the production of each of the succeeding strips the needles that are required therefor, provisions whereby during reciprocating knitting each group of needles in succession while operative is centralized with reference to the knitting or stitch-cams, a cam by which all the needles are restored to operative relations on completion of the last strip, and pattern-connections for controlling the various parts.

11. In a circular knitting machine constructed for rotary and reciprocating knitting, an organization for the knitting of glove-units and the like, comprising essentially, in combination with a needle-cylinder, needles, and knitting or stitch-cams, special butts or heels in connection with the needles, withdrawal and group-selective cams, by the former of which the needles that are not required for the production of a selvaged strip are withdrawn from operative relations and afterward those used for such production and for that of the succeeding strip or strips are likewise withdrawn, and the latter acting to return to operative relations for the production of each of the succeeding strips the needles that are required therefor, including widening or gusset needles, provisions whereby during reciprocating knitting each group of needles in succession while operative is centralized with reference to the knitting or stitch-cams, a cam by which all the needles are restored to operative relations on completion of the last strip, and pattern-connections for controlling the various parts.

12. A circular knitting machine comprising, in combination with a needle-cylinder, a circular series of needles, knitting or stitch-cams, and pattern-controlled actuating connections for rotary and reciprocating knitting, pattern-controlled means whereby a group of said needles is selected in a given stroke for producing by reciprocating knitting a selvaged flat strip in continuation of tubular work and the remaining needles are rendered inoperative to knit, pattern-controlled means for centralizing in a given stroke by relative angular shift the said group and the said knitting or stitch-cams with reference to each other for the knitting of the said selvaged strip, and means for restoring all of the needles to operative relations upon the completion of such strip.

13. In a circular knitting machine constructed for rotary and reciprocating knitting, an organization comprising essentially, in combination with a needle-cylinder, needles, and knitting or stitch-cams, one or more withdrawal cams whereby the needles used in knitting a tubular web are rendered inoperative to knit with the exception of a selected group of needles on which a selvaged flat strip is knit by reciprocating knitting, means for centralizing the selected group of needles and knitting or stitch-cams with reference to each other during the reciprocating knitting, means for restoring all the needles to operative relations upon the completion of the said strip, and pattern-connections for controlling the various parts.

14. In a circular knitting machine, the combination with a needle-cylinder, needles, knitting or stitch-cams, and cylinder-actuating mechanism pattern-controlled to effect continuous rotary and reciprocating cylinder-movement as required, of clutch-devices pattern-controlled and acting to occasion by one working stroke an angular shift of the needle-cylinder relative to the said mechanism to centralize a selected group of needles with reference to the knitting or stitch-cams during reciprocating knitting.

15. In a circular knitting machine, the combination with a needle-cylinder, needles, knitting or stitch-cams, and cylinder-actuating mechanism pattern-controlled to effect continuous rotary and reciprocating cylinder movement as required, of means for selecting successive groups of needles for the production of strips, and clutch-devices pattern-controlled and acting to occasion successive respectively complete angular shifts of the needle-cylinder relative to the said mechanism to centralize the respective groups of needles with reference to the knitting or stitch-cams during the knitting of the respective strips.

16. In a circular knitting machine adapted to knit successive strips side by side upon adjoining groups of needles, the combination with a needle-cylinder, needles, knitting or stitch-cams, and cylinder-actuating mechanism including a member that is rotated for tubular knitting and reciprocated for strip-knitting of clutch-devices adapted to connect the needle-cylinder operatively with said member in different angular relationships a cylinder-braking device, and pattern-connections whereby in beginning to knit a strip said clutch-devices are opened and said braking device brought into operation during a stroke of said member, to occasion a shift bringing the corresponding group of needles into centralizing relationship with the said cams for knitting such strip.

17. In a circular knitting machine adapted to knit successive strips side by side upon adjoining groups of needles, the combination with a needle-cylinder, needles, knitting or stitch-cams, and a cylinder-actuating mechanism including a member that is rotated for tubular knitting and reciprocated for strip-knitting, of clutch-devices adapted to connect the needle-cylinder operatively with said member in different angular relationships and comprising a flange having notches spaced to correspond with the needle-groups and a dog adapted to occupy the respective notches, and pattern-connections whereby, in beginning to knit a strip, during a stroke of said member the dog is disengaged from the notch previously occupied by it and its transfer to another is occasioned to bring into centralized relationship with the said cams the needle-group upon which such strip is to be knit.

18. In a circular knitting machine adapted to knit successive strips side by side upon adjoining groups of needles, the combination with a needle-cylinder, needles, knitting or stitch-cams, and cylinder-actuating mechanism including a member that is rotated for tubular knitting and reciprocated for strip-knitting, of clutch-devices adapted to connect the needle-cylinder operatively with said member in different angular relationships and comprising a flange having notches spaced to correspond with the needle-groups and a dog adapted to occupy the respective notches, a cylinder-braking device, and pattern connections whereby in beginning to knit a strip, during a stroke of said member the braking-device is applied and the dog is disengaged from the notch previously occupied by it and its transfer to another notch is occasioned to bring into centralized relationship with the said cams the needle-group upon which such strip is to be knit.

19. In a circular knitting machine adapted to knit successive strips side by side upon adjoining groups of needles, the combination with a needle-cylinder, needles, knitting or stitch-cams, and cylinder-actuating mechanism including a member that is rotated for tubular knitting and reciprocated for strip-knitting, of clutch-devices adapted to connect the needle-cylinder operatively with said member in different angular relationships and comprising a flange having notches spaced to correspond with the needle-groups and a dog adapted to occupy the respective notches, a brake-band for the needle-cylinder, and pattern-connections whereby, in beginning to knit a strip, during a stroke of said member the brake-band is tightened to hold the needle-cylinder and the dog is disengaged from the notch previously occupied by it and its transfer to another notch is occasioned to bring into centralized relationship with the said cams the needle-group upon which such strip is to be knit.

20. A knitting machine for knitting a selvaged narrow strip in continuation of a larger web, having combined therein knitting or stitch cams, means for selecting a group of needles, the remainder being rendered inoperative, and bringing said group into operative relation with the knitting cams, and pattern-controlled means operating in a given stroke of the machine to centralize the said group and the knitting or stitch cams with reference to each other by relative shift for the knitting of the said selvaged strip.

21. A knitting machine according to claim 20 having the centralizing means composed of clutch-devices pattern-controlled to occasion a relative angular shift between the movable cylinder and the actuating means therefor.

22. A knitting machine according to claim 20 having the centralizing means composed of clutch-devices pattern-controlled to occasion a relative angular shift between the movable cylinder and the actuating means therefor, with said clutch-devices comprising a flange having notches spaced apart to correspond with the needle-groups, and a dog adapted to occupy the respective notches.

23. A knitting machine for knitting a selvaged narrow strip in continuation of a larger web, having combined therein knitting cams, and pattern-controlled means operating in a given stroke of the machine to select the group of needles for said strip and render the needles not required for the strip inoperative to knit, and bringing said group into operative relation with the knitting cams.

24. A knitting machine adapted for knitting a selvaged narrow strip in continuation of a larger web, having combined therein knitting or stitch-cams, one or more pattern-controlled withdrawal cams operating to select the group of needles on which such strip is knit through withdrawal, into inoperative relations, of those needles which are not required for the strip, and means for centralizing the said group of needles and the knitting or stitch-cams with reference to each other for the knitting of the strip.

25. A knitting machine adapted to knit a main web and a series of narrow selvaged strips in continuation thereof, having combined therein knitting or stitch-cams, means whereby the group of needles on which a strip is to be knit is selected in a given stroke of the machine, for each of said strips in succession, and means operating in a stroke of the machine to centralize the operative group of needles and the knitting or stitch-cams with reference to each other for each respective strip.

26. A knitting machine adapted to knit a main web and a series of narrow selvaged strips in continuation thereof, comprising, in combination, knitting or stitch-cams, needle withdrawal and needle restoring cams, group-selecting cams, and needles having butts for engagement by said withdrawal, restoring and selective cams, including selective butts arranged in groups.

27. A knitting machine adapted to knit a main web and a series of narrow selvaged strips in continuation thereof and provided with a withdrawal cam or cams arranged to withdraw the needles that are not required for the production of the first strip of a series of strips from operative relations, and afterward withdraw those used for such production and for that of the succeeding strip or strips of said series, and group-selective cams arranged to restore to operative relations in successive groups the needles required for the production of each of the strips succeeding the first.

28. A knitting machine adapted to knit a main web and a series of narrow selvaged strips in continuation thereof, and provided with a withdrawal cam or cams arranged to withdraw the needles that are not required for the production of the first strip of a series of strips from operative relations, and afterward withdraw those used for such production and for that of the succeeding strip or strips of said series, group-selective cams arranged to restore to operative relations in successive groups the needles required for the production of each of the strips succeeding the first, and including in the needle-series thereof widening or gusset needles having butts in two adjoining groups and which are rendered operative by the group-selective cams to knit widenings or gussets on the successive strips.

29. A knitting machine adapted to knit a main web and a series of narrow selvaged strips in continuation thereof, comprising, in combination, knitting or stitch-cams, needle withdrawal and needle restoring cams, group-selective cams, needles having butts for engagement by said withdrawal, restoring and selective cams, including selective butts arranged in groups, and means operating in a given stroke of the machine to centralize the operative group of needles and the knitting or stitch-cams with reference to each other for the knitting of a strip.

30. A knitting machine adapted to knit a main web and a series of narrow selvaged strips in continuation thereof, comprising, in combination, knitting or stitch-cams, needle withdrawal and needle restoring cams, group-selective cams, needles having butts for engagement by said withdrawal, restoring and selective cams, including selective butts arranged in groups, and centralizing means operating for successive strip-production, and having a mass-withdrawal cam or cams arranged to determine the operative group of needles for one strip, and a group-withdrawal cam arranged to cooperate with a group-selective cam to determine the operative group of needles for another strip, said mass-withdrawal cam or cams also arranged to cooperate with group selective cams to determine the operative groups of needles for other strips.

31. A knitting machine adapted to knit a main web and a series of narrow selvaged strips in continuation thereof, having knitting or stitch-cams, mass-withdrawal and needle-restoring cams including a vertically movable mass-withdrawal cam and also a radially movable one, group-selective cams, needles having certain of the butts or heels thereof in groups of different lengths for engagement by said mass-withdrawal cams, a group-withdrawal cam that engages with one of the groups of selective butts, and centralizing means operating for successive strip-production.

32. A knitting machine according to claim 20 having cylinder-actuating mechanism including a member that is reciprocated during strip knitting, clutch-devices adapted to connect the needle-cylinder operatively with said member in different angular relationships, a cylinder-braking device, and pattern-connections whereby in beginning to knit a strip said clutch-devices are opened and said braking device is brought into operation during a stroke of said member to occasion a shift bringing the corresponding group of needles into centralized relationship with the knitting or stitch-cams for knitting such strip.

33. A knitting machine for the production of tubular work having a plurality of selvaged strips formed integral with the tubular work, comprising a circular series of needles and a carrier therefor, knitting cams, selective means to render said needles divisible into groups for reciprocating work; non-knitting cams cooperating with said selective means in effecting the segregation for each strip in succession, of the corresponding strip-group for the beginning of the strip, the other needles remaining inoperative to knit until the completion of the strip, and the restoration of the strip-group upon such completion; means relatively to rotate said needle carrier for effecting tubular work and means relatively to reciprocate said needle carrier for the production of said selvaged strips.

34. A knitting machine having a circular series of needles and a carrier therefor, knitting cams, selective means to render said needles divisible into groups for reciprocating work, non-knitting cams cooperating with said selective means to complete the segregation of said groups and the restoration thereof, said non-knitting cams including a plural-needle-group-withdrawal cam or cams.

35. A knitting machine having a circular series of needles and a carrier therefor, knitting cams, selective means for rendering said needles divisible into groups for reciprocating work, non-knitting cams cooperating with said selective means to complete the segregation of said groups and the restoration thereof, means relatively to rotate said needle carrier for effecting tubular work, and means relatively to reciprocate said needle carrier for the production of a plurality of selvaged strips formed with the tubular work, said non-knitting cams including plural-needle-group-withdrawal cams and needle-restoring cams.

36. A knitting machine having a circular series of needles and a carrier therefor; knitting cams, selective means to render said needles divisible into groups for reciprocating work, non-knitting cams cooperating with said selective means to complete the segregation of said groups and the restoration thereof, means relatively to rotate said needle carrier for effecting tubular work, and means relatively to reciprocate said needle carrier for the production of a plurality of selvaged strips formed with the tubular work, said non-knitting cams including one or more plural needle group-withdrawal cams.

37. A knitting machine having a circular series of needles and a carrier therefor, knitting cams, means to render selectively said needles divisible into groups for reciprocating work, non-knitting cams cooperating with said selective means to complete the segregation of said groups and the restoration thereof, means relatively to rotate said needle carrier for effecting tubular work, and means relatively to reciprocate said needle carrier for the production of a plurality of selvaged strips formed integral with the tubular work, said non-knitting cams including plural-group-withdrawal cams, single group-withdrawal cams, and needle restoring cams.

In testimony whereof I affix my signature in presence of two witnesses.

GEORGE P. BOSWORTH.

Witnesses:
JOHN LAWSON,
JAMES L. DEGNAN.